United States Patent
Alfaro et al.

(10) Patent No.: US 10,341,839 B2
(45) Date of Patent: Jul. 2, 2019

(54) METHOD AND APPARATUS FOR MAINTAINING MISSION CRITICAL FUNCTIONALITY IN A PORTABLE COMMUNICATION SYSTEM

(71) Applicant: MOTOROLA SOLUTIONS, INC., Chicago, IL (US)

(72) Inventors: Javier Alfaro, Miami, FL (US); Kurt S. Fienberg, Plantation, FL (US); Daniel Landron, Sunrise, FL (US); Kevin D. Elliott, Weston, FL (US); David Corvino, Parkland, FL (US); Hua Li, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/996,837

(22) Filed: Jun. 4, 2018

(65) Prior Publication Data

US 2019/0141508 A1   May 9, 2019

Related U.S. Application Data

(62) Division of application No. 15/599,293, filed on May 18, 2017, now Pat. No. 10,015,658.

(51) Int. Cl.
*H04M 11/04* (2006.01)
*H04W 4/90* (2018.01)
(Continued)

(52) U.S. Cl.
CPC ......... *H04W 4/90* (2018.02); *H04M 1/72527* (2013.01); *H04M 1/72536* (2013.01);
(Continued)

(58) Field of Classification Search
CPC ..... H04W 76/007; H04W 4/22; H04W 8/245; H04W 88/02; H04M 11/04;
(Continued)

(56) References Cited

U.S. PATENT DOCUMENTS

| | | |
|---|---|---|
| 4,232,390 A | 11/1980 | McEvilly, Jr. |
| 7,019,955 B2 | 3/2006 | Loeb et al. |

(Continued)

FOREIGN PATENT DOCUMENTS

WO   2014143491 A1   9/2014

OTHER PUBLICATIONS

Jerad Lewis and Dr. Brian Moss: MEMS Microphones, the Future for Hearing Aids, Analog dialogue 47-11, Nov. 2013, www.ananlog.com/analogdialogue, all pages.

*Primary Examiner* — Danh C Le
(74) *Attorney, Agent, or Firm* — Barbara R. Doutre

(57) ABSTRACT

A portable communication system (100) maintains mission critical functionality. An accessory (120) and a handset (130) are tethered and interoperate such that the accessory operates as the primary controlling device and the handset operates as a secondary device. The accessory (120) contains a main applications processor (102) that handles non-mission critical functions. The accessory further contains a mission critical processor (104) for handling mission critical functions of transmit and receive audio as well as PTT and emergency. In response to a failure of the mission critical processor (104), the mission critical functions are maintained by handing over the mission critical functions to the non-controlling device in a manner transparent to the user. The handover is triggered in response to status changes of the mission critical processor or as a result of battery (Continued)

depletion. Audio paths are re-routed through backup paths (146b, 148) negating reliance on processors of the accessory (120).

8 Claims, 3 Drawing Sheets

(51) Int. Cl.
| | |
|---|---|
| *H04M 1/725* | (2006.01) |
| *H04W 4/10* | (2009.01) |
| *H04W 40/36* | (2009.01) |
| *H04W 40/02* | (2009.01) |
| *H04W 36/00* | (2009.01) |
| *H04W 24/04* | (2009.01) |
| *H04W 52/02* | (2009.01) |
| *H04W 88/06* | (2009.01) |

(52) U.S. Cl.
CPC ......... *H04M 1/72538* (2013.01); *H04W 4/10* (2013.01); *H04W 24/04* (2013.01); *H04W 36/0022* (2013.01); *H04W 40/02* (2013.01); *H04W 40/36* (2013.01); *H04W 52/0296* (2013.01); *H04W 88/06* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/26* (2018.01)

(58) Field of Classification Search
CPC ......... H04M 1/72525; H04M 1/72522; H04M 1/72533; H04M 1/7253; H04M 1/72519; H04M 19/08; H04B 1/3883
USPC ........................ 455/404.1, 418, 550.1, 556.2
See application file for complete search history.

(56) References Cited

U.S. PATENT DOCUMENTS

| | | | |
|---|---|---|---|
| 7,515,721 B2 | 4/2009 | Tashev et al. | |
| 7,823,175 B1 * | 10/2010 | Harvey | G06Q 30/0251 380/210 |
| 7,929,714 B2 | 4/2011 | Bazarjani et al. | |
| 8,243,208 B2 | 8/2012 | Vasella | |
| 9,554,061 B1 | 1/2017 | Proctor, Jr. et al. | |
| 2005/0013455 A1 | 1/2005 | Loeb et al. | |
| 2005/0107519 A1 | 5/2005 | Loeffler et al. | |
| 2008/0197801 A1 * | 8/2008 | Manor | H02J 7/0054 320/103 |
| 2009/0006308 A1 * | 1/2009 | Fonsen | H04W 60/06 |
| 2009/0052714 A1 * | 2/2009 | Wilbur | H04B 1/385 381/364 |
| 2009/0191911 A1 | 7/2009 | Wilson | |
| 2009/0236913 A1 * | 9/2009 | Mariasis | H02J 9/062 307/66 |
| 2010/0119083 A1 * | 5/2010 | Logalbo | H04R 3/04 381/111 |
| 2012/0025615 A1 * | 2/2012 | Kim | H02J 9/062 307/66 |
| 2012/0106753 A1 | 5/2012 | Theverapperuma et al. | |
| 2012/0290742 A1 | 11/2012 | Sun et al. | |
| 2013/0127687 A1 | 5/2013 | Yu | |
| 2013/0195283 A1 | 8/2013 | Larson et al. | |
| 2013/0238237 A1 | 9/2013 | Abramson Liani et al. | |
| 2013/0271062 A1 * | 10/2013 | Lu | H02J 7/35 320/101 |
| 2014/0001884 A1 | 1/2014 | Doi et al. | |
| 2014/0084828 A1 * | 3/2014 | Yamamoto | H02M 1/32 318/400.22 |
| 2014/0363017 A1 | 12/2014 | Kung | |
| 2015/0340898 A1 * | 11/2015 | Schwartz | G06F 1/266 320/103 |
| 2016/0374024 A1 * | 12/2016 | Nunez | H04W 52/0251 |
| 2017/0031859 A1 | 2/2017 | Igarashi et al. | |
| 2017/0041694 A1 | 2/2017 | Jaiswal et al. | |
| 2017/0045899 A1 * | 2/2017 | Zywicki | G05D 23/1905 |
| 2017/0142517 A1 | 5/2017 | Borkhovik et al. | |
| 2017/0178090 A1 * | 6/2017 | Sarin | G06Q 20/3224 |
| 2017/0178091 A1 * | 6/2017 | Sarin | G06Q 20/3224 |
| 2017/0201818 A1 | 7/2017 | Smith | |
| 2017/0264987 A1 * | 9/2017 | Hong | H04R 1/1025 |
| 2018/0077620 A1 * | 3/2018 | Hassan | H04W 76/11 |
| 2018/0090942 A1 * | 3/2018 | Nunez | H02J 7/007 |
| 2018/0145745 A1 * | 5/2018 | Sachs | G06F 13/36 |

* cited by examiner

METHOD AND APPARATUS FOR MAINTAINING MISSION CRITICAL FUNCTIONALITY IN A PORTABLE COMMUNICATION SYSTEM

FIELD OF THE INVENTION

The present invention relates generally to communication devices and more particularly to a method and apparatus for maintaining mission critical functionality operation for a portable communication device and an accessory communication device.

BACKGROUND

Portable communication systems often incorporate both a main controlling communication device, such as a portable handset radio, and an accessory, such as a remote speaker microphone, wherein the accessory provides remote functionality of certain features of the main controlling communication device. Public safety agencies, such as law enforcement, fire rescue, and emergency medical often make use of these portable communication systems. The two devices may be tethered to operate cooperatively to provide mission critical functions to a user. The ability to maintain mission critical functions, including transmit audio, receive audio, push-to-talk (PTT), and emergency control signals, is paramount in public safety environments. However, devices operating within the harsh environments associated with public safety operations can sometimes encounter one or more fault conditions which can impact control of mission critical functions. Past mission critical control approaches still face challenges with missed receive calls and PTT/emergency operation. The occurrence of fault conditions may result in mission critical functions being interrupted or even lost.

Accordingly, there is a need to maintain mission critical functionality in a portable communication system, even upon the occurrence of a fault condition. Maintaining mission critical functionality in a manner transparent to the user is highly desirable.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
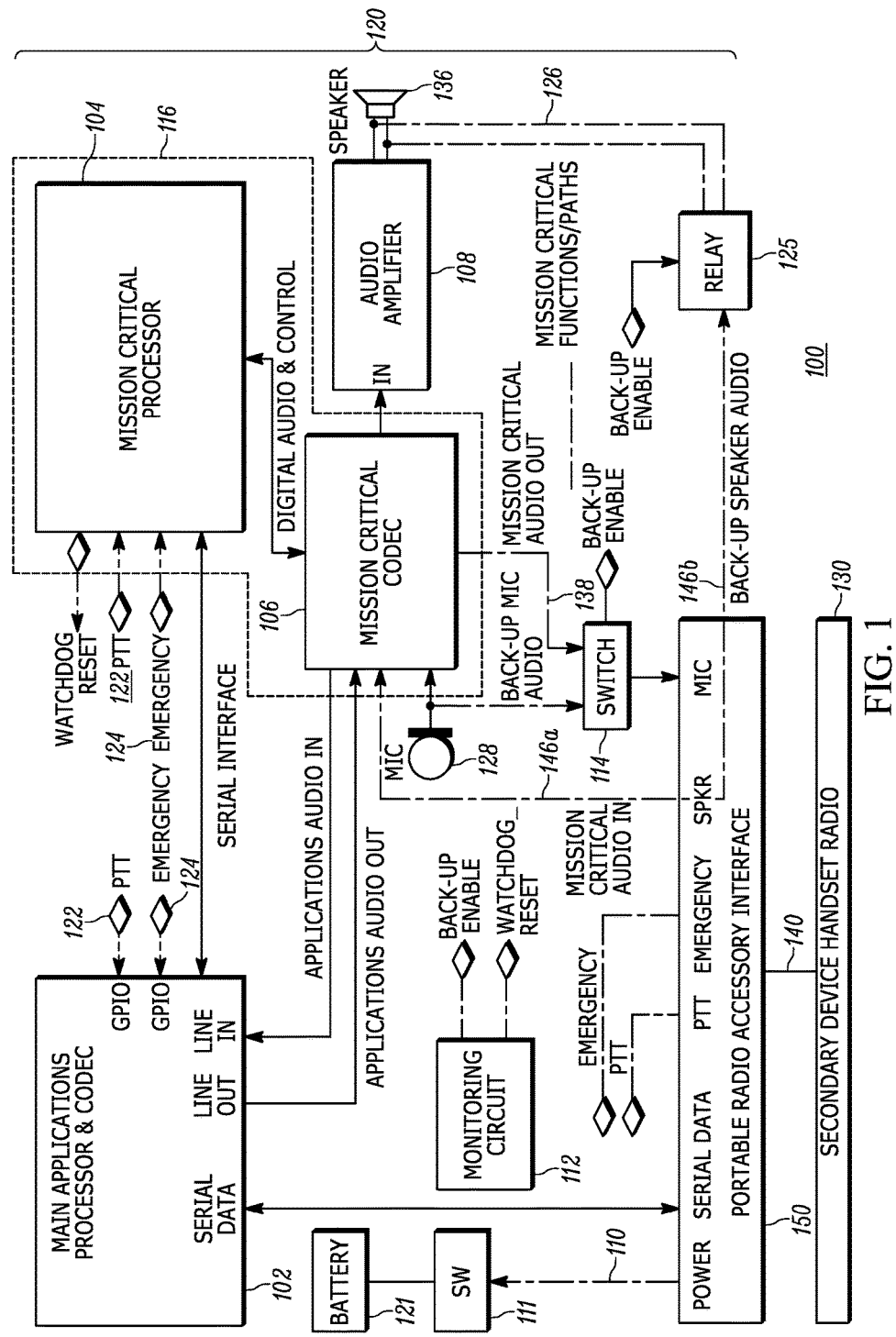
FIG. 1 is a block diagram for a portable communication system formed and operating in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is described herein a method and apparatus for maintaining mission critical functionality in a portable communication system comprising two battery powered and processor driven devices, such as a handset radio and an accessory, tethered via an interface cable. The accessory device performs the role of a primary controlling device while the other unit performs the role of a secondary device that can operate as a mission critical modem. The primary controlling accessory device comprises an application processor that can handle other non-mission critical functions, such as video, LTE applications, and messaging to name a few. In response to a failure of a mission critical processor control, mission critical functions are maintained by handing over mission critical functions to the non-controlling handset device in a manner transparent to the user. Transparency to the user means the handover takes place without audio holes, latencies, missed PTT, or missed emergency. In accordance with the embodiments, the handover is triggered in response to status changes of the mission critical processor or as a result of battery depletion. Audio connections are re-routed through a backup path that provides an alternative route for audio signals between devices that is purely analog and that does not pass through or rely on processors of the primary controlling device. The audio processing of receive and transmit audio is also rerouted to the non-controlling secondary handset device. The primary controlling accessory device of the portable communication system isolates mission critical functions (audio processing, routing, and control) from the application processor on the controlling device by using a mission critical co-processor only assigned to these functions, thereby providing immunity to application processor failures.

FIG. 1 is a block diagram of a communication system 100 formed and operating in accordance with some embodiments. Portable communication system 100 comprises two communication devices designated as an accessory 120 and a handset 130, tethered via a data communication link 140 through an interface 150, In accordance with some embodiments, the accessory 120 provides cellular type communication, such as long term evolutions (LTE) communication, while the handset 130 provides two-way radio communication, such as land mobile radio (LMR) communication. The LMR functionality provides two way communication for emergency first responder organizations such as police, fire, and ambulance services, public works organizations, dispatched services such as taxis, or companies with large vehicle fleets or numerous field staff. The LMR functionality operates in conjunction with other fixed systems such as the public switched telephone network (PSTN) or cellular networks. The LTE functionality of accessory 120 provides for high-speed wireless communication with other mobile phones and data terminals.

Each device provides a plurality of mission critical functionality comprising push-to-talk (PTT), emergency, and receive/transmit (RX/TX) wherein the mission critical functionality of the handset 130 is handled by the LMR communications, and the mission critical functionality of the accessory 120 is handled by the LTE communications. In normal mode operation, handset 130 provides PTT over LMR and accessory 120 provides PTT over LTE. In normal mode operation, mission critical receive audio is routed through a low power audio path 146a for processing by the LTE accessory, via a mission critical codec 106 and an audio amplifier 108, for playing out at a speaker 136 of accessory 120.

In accordance with the various embodiments, portable communication system 100 operates the accessory 120 as a primary controlling device and operates the handset 130 as a secondary device in a manner that maintains the functionality of the accessory's mission critical functions under normal operating conditions as well as one or more faulty operating conditions which may be incurred at the accessory 120. For the purposes of this application, the accessory 120 will also be referred to interchangeably as the primary controlling accessory 120, and the handset will be referred to as the secondary handset device 130. The accessory's mission critical functions are designated as push-to-talk (PTT) 122, emergency 124, and receive/transmit (RX/TX) audio at microphone 128 and speaker 136 operating within the LTE system. The handset provides, as mentioned previously, similar mission critical functions operating within the LMR system.

The RX/TX audio of the accessory 120 are processed through a mission critical processor 104 and mission critical codec 106, which together are referred to as a mission critical controller 116. The mission critical codec 106 generally provides encoding for audio input to microphone 128 for transmission. The mission critical codec 106 also generally provides decoding of digital receive audio for playout to the speaker 136. The accessory 120 provides LTE communication, while the handset provides LMR communication. Under normal mode operating conditions, activation of the accessory PTT 122 of accessory 120 enables a transmit mode in which audio spoken into microphone 128 is processed through the mission critical controller 116 and RF circuitry (not shown) for transmission over the LTE network. In receive mode, input signals over the LTE band are received at an LTE receiver (not shown) and processed through the mission critical controller 116 of accessory 120, and then amplified at the audio amplifier 108 and played out as received audio at speaker 136. Under normal mode operating conditions, the mission critical functions of PTT 122 and emergency 124 are processed by applications processor 102 and mission critical controller 116, and transmissions are handled, as LMR transmissions, by the secondary handset device 130 using audio from the primary controlling accessory device 120. Under normal operating conditions, power to the accessory 120 is provided by a battery 121 switched in through a switch 111.

In accordance with the various embodiments, the mission critical processor 104 monitors the main application processor 102 for fault conditions (stalls and failures), while a monitoring circuit 112 monitors the mission critical processor 104 for failures and monitoring circuit 112 also monitors for low battery at battery 121.

In accordance with the embodiments, the one or more faulty operating conditions which may be incurred at the primary controlling accessory device 120 may comprise one or more of: a stalled application associated with main application processor 102, a processor failure (the processor being the main application processor 102 and/or the mission critical processor 104), drop in data communication link 140 between the tethered devices 120, 130, and/or battery depletion of battery 121. While the block diagram of system 100 shows application and processing elements for the accessory 120 for operation within an LTE network, it is appreciated that similar elements are duplicated and reside within handset 130 for operation within an LMR network. The various responses to the monitored faults are described next.

Fault Condition—Battery Level:

In response to the monitoring circuit 112 detecting that the battery level of battery 121 has fallen below a predetermined threshold, the secondary device 130 enables and sends a power signal 110 from the secondary device 130 to switch 111 of the primary device 120 thereby enabling backup power to the accessory. When the battery level of battery 121 is acceptable there is no need to switch power sources.

Fault Condition—Transmit Audio.

The monitoring circuit 112 monitors for a fault in the mission critical controller 116 during transmit audio. The accessory 120 comprises an analog switch 114 operatively coupled to the microphone 128 and the mission critical codec 106. The switch 114, when enabled by monitoring circuit 112, switches mission critical transmit audio 138 to a backup microphone audio path 148 over to a microphone path of the interface 150, thereby re-routing mission critical transmit audio to the handset 130 for transmission over the LMR network.

Fault Condition—Receive Audio.

The monitoring circuit 112 also monitors for a fault condition in the mission critical controller 116 during receive audio. The accessory 120 comprises an analog relay 125 operatively coupled to the monitoring circuit 112 and speaker 136. In response to a fault condition being detected by monitoring circuit 112, receive audio processed from the LMR network of the handset 130 is routed through interface 140 over to a high power back up audio path 146b of the accessory 120. The monitoring circuit 112 triggers the relay 125 which allows audio routed through backup speaker audio path 146b to be relayed and played at accessory speaker 136.

Accordingly, bi-directional mission critical communications is provided between tethered devices 120, 130. Fault conditions such as battery depletion, stalled application, software failure, processor failure, and/or drop in data communication link between devices are occur are addressed by:

1. Fail-safe switching via switch 114 from the transmit audio path 138 (mission critical audio out) to the backup transmit audio path 148 for transferring mission critical transmit audio from the primary device 120 into the secondary device 130 at interface 150 for processing and transmission, in the event of a partial or full system failure of the primary device.
2. Fail-safe switching via relay 125 taking high power LMR audio 146 from the secondary device 130 at interface 150 and relaying it along receive path 126 to the accessory speaker 136 in the event of a partial or full system failure of the primary accessory device 120.
3. Failure-safe switching 111 of the primary device's main power supply 121 to a backup power supply signal 110 supplied through interface 150 from the secondary handset device 130.
4. Failure-safe switching, via watch dog reset of monitoring circuit 112 of the primary device's emergency indicator system and PTT from primary device 120 to the secondary device 130 thereby ensuring full functionality of the emergency mission critical feature.

The following Table provides a summary of the Controlling Device Modes of Operation (not in any order):

| Mode | Description of Controlling Device | Processing of PTT/Emergency | Audio Processing |
|---|---|---|---|
| Normal | Normal Operation | Application Subsystem/ Mission Critical Subsystem/ Non-Controlling Device | Mission Critical Subsystem |
| Fault 1 | Application Subsystem stall | Mission Critical Subsystem/ Non-Controlling Device | Mission Critical Subsystem |
| Fault 2 | Application Subsystem reset | Mission Critical Subsystem/ Non-Controlling Device | Mission Critical Subsystem |
| Fault 3 | Mission Critical Subsystem failure/reset | Non-Controlling Device | Non-Controlling Device |
| Fault 4 | Failure on Tethered connection between devices | Application Subsystem/ Mission Critical Subsystem | Mission Critical Subsystem |
| Dead Battery | Depleted battery on controlling unit | Non-Controlling Device | Non-Controlling Device |

Normal operation provides for control of PTT and emergency through the main application processor 102, mission critical processor 104, and the non-controlling secondary handset device 130. The secondary handset device 130 provides, and is only involved in operation as an LMR modem, and responds to PTT and emergency input from the accessory 120. The audio processing is controlled via the mission critical controller 116 of accessory 120.

The first fault condition, in which a software application of main application processor 102 stalls, results in PTT 122 and emergency 124 being controlled by the mission critical processor 104 and the non-controlling handset device 130. The audio processing is controlled via the mission critical controller 116 of accessory 120.

The second fault condition, in which the main application processor 102 resets, results in PTT 122 and emergency 124 being controlled by the mission critical processor 104 and the non-controlling handset device 130 operates as an LMR modem in response thereto. The audio processing is controlled via the mission critical controller 116 of accessory 120.

The third fault condition, in which the mission critical processor 104 fails or resets, results in PTT 122 and emergency 124 being processed by the secondary non-controlling handset device 130. The audio processing is also processed via the secondary, non-controlling handset device 130. This third fault mode is the mode which triggers the alternative transmit and receive back-up paths. Under the third fault condition, the user can still advantageously enable PTT 122 and speak into microphone 128 at the accessory 120 during transmit mode, and advantageously listen, during receive mode, to audio played out at accessory speaker 136. However, the processing of the emergency press, PTT press and audio routing take place within the secondary handset 130.

The fourth fault condition, in which a failure occurs between the tethering of the two devices 120, 130, results in PTT 122 and emergency 124 being processed by the main application processor 102 and mission critical processor 104 of accessory 120. The audio processing is processed via the mission critical controller 116 for communication over LTE.

The various embodiments provides operation under all of the fault conditions to ensure that audio can still advantageously be input to the accessory microphone 128 during transmit mode, and receive audio can advantageously be played out over the accessory speaker 136 during receive mode. Key presses of PTT and emergency can advantageously be entered at accessory 120 under all conditions.

Hence, mission critical functionality has been preserved between two tethered devices even when the primary controlling accessory device 120 incurs a fault mode.

Figure 2:
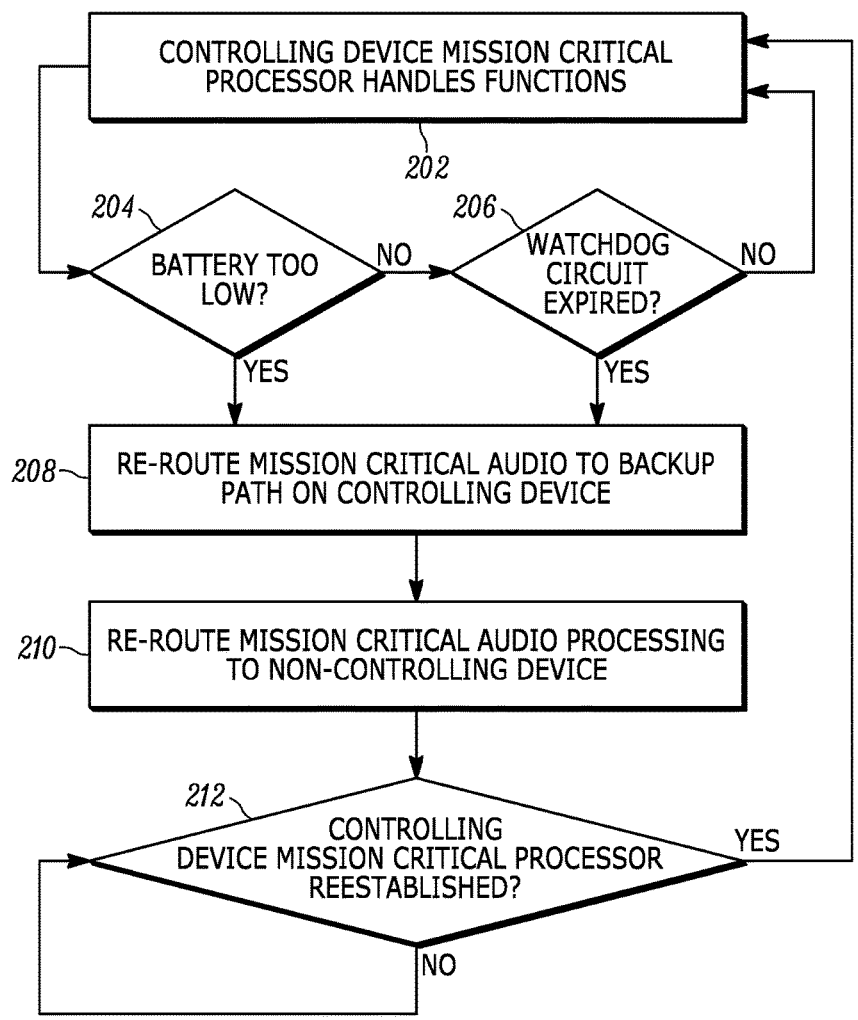
FIG. 2 is a flowchart of a method for maintaining control of mission critical functionality in accordance with various embodiments.

FIG. 2 is a flowchart of a method 200 of operating the communication system 100 of FIG. 1 in accordance with some embodiments. Method 200 begins at 202 by handling mission critical functions by a primary controlling device. For example, in a public safety environment, the accessory 120 of FIG. 1 may be worn at the shoulder and operating as the primary controlling device while the portable handset 130 is operating as a secondary device. The accessory provides transmit and receive audio, wherein the transmit audio is enabled via a push-to-talk (PTT) button at the accessory and receive audio is played out over the accessory speaker 136. The method monitors for the occurrence of one or more fault conditions which may occur as a result of a battery level falling below a predetermined threshold at 204 or as a result of a watchdog timer expiring at 206.

If the watch dog timer indicates at 206 that all accessory processors are operating appropriately then control of mission critical functions remains with the controlling accessory device at 202. When either the battery level falls too low at 204 or the watch dog timer indicates a processor issue, then a re-routing of mission critical audio to a backup path of the controlling accessory device takes place at 208. Mission critical audio processing is then rerouted to the non-controlling secondary handset device at 210. When the mission critical processor of the accessory is determined to be re-establishment at 212, then control of mission critical functions returns to the primary controlling accessory device for processing by the mission critical processor at 202.

Figure 3:
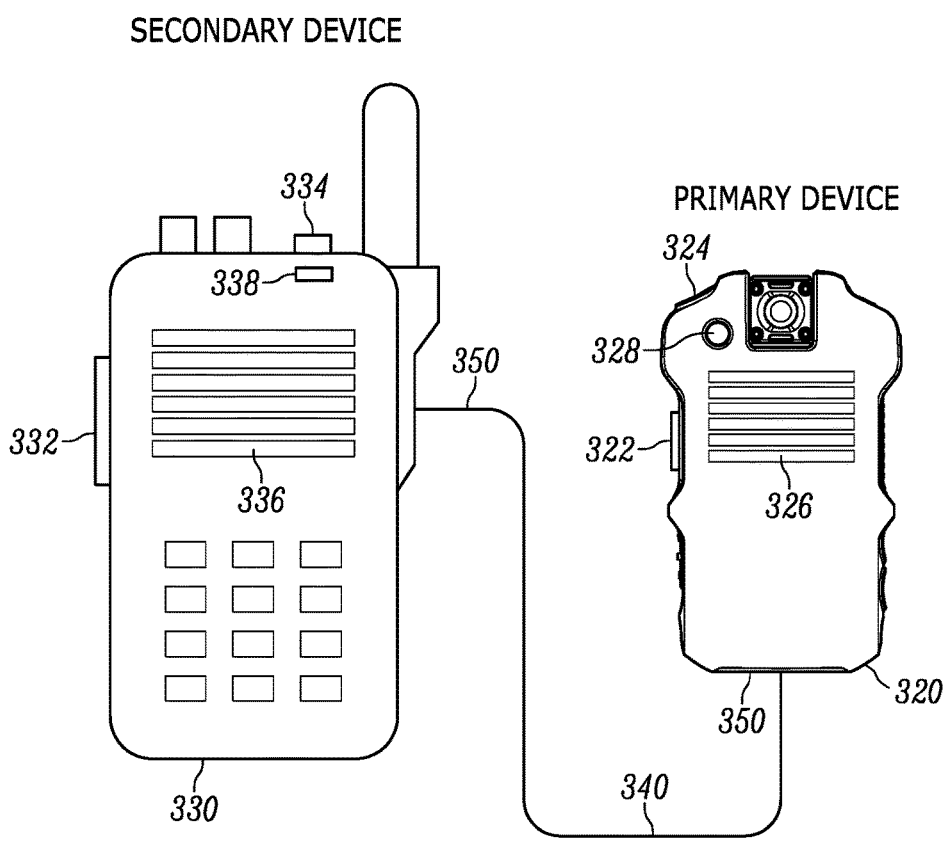
FIG. 3 is a portable communication system formed and operating in accordance with the various embodiments.

FIG. 3 shows a portable communication system 300 comprising an accessory 320 and a portable handset 330 tethered by interface cable 340 formed and operating in accordance with the various embodiments. Communication system 300 is particularly beneficial to public safety environments through its ability to maintain mission critical functionality. The accessory 320, which is preferably a shoulder-worn device, provides ease of access to mission critical user interface features such as PTT 322, emergency 324, and receive/transmit audio via speaker 336 and microphone 338. In accordance with the embodiments, the accessory 320 operates as the primary device and in normal operating mode provides all the processing and battery power necessary to control the mission critical control features of PTT 322, emergency 324, and receive/transmit audio at speaker 336 and microphone 338 in conjunction with handling other non-mission critical functions. These non-mission critical functions may comprise, for example, video at camera 328, LTE applications, and messaging (via a display on back/not shown) to name a few. The radio handset 330 operates as a secondary, non-controlling device providing land mobile radio (LMR) functionality and has its own processing which allows for duplicate availability of a PTT 332 and emergency button 334. However, in accordance with the embodiments, the audio routing in normal mode operation remains at the primary controlling accessory device 320.

Portable communication system 300 provides operation through various fault conditions incurred at the controlling accessory device 320 as previously described. Again the fault conditions at the accessory 320, in no particular order, may comprise one or more of: battery depletion, stalled application at an application processor (software failure), processor failure (application processor and/or mission critical processor), and/or drop in data communication link between devices 320, 330.

From a user standpoint, the user is always able to press PTT 322 and emergency 324 at the accessory device 320 and the system 300 will process these button presses despite the described fault conditions. In accordance with the various embodiments, receive audio input to accessory microphone 322 will always be processed by one device or the other despite the various fault conditions. In accordance with the various embodiments, transmit audio will always play out of accessory speaker 326 despite the various fault conditions. The audio paths may be re-routed in accordance with the fault modes so that processing of the audio takes place at the handset 330 when needed.

Accordingly, there has been provided an improved method and apparatus for maintaining mission critical communication between two tethered devices when the primary device fails. The improved mission critical functionality is advantageously based on providing mission critical control to the primary controlling accessory device via a combination of application processor and independent power supply added to the accessory making that accessory the primary controlling device to the handset, now operating as a secondary device. The smart accessory of the various embodiments maintains mission critical functionality despite battery status or mission critical processor status. Maintaining mission control at the accessory device is far more beneficial to the user by allowing PTT/emergency to remain activated at the accessory device rather than reverting control to the handset device (LMR radio located at the belt), where the user may not be aware that such transition took place and attempt to activate PTT or emergency functions without success.

Additionally, maintaining functionality at the accessory negates missing receive calls that can occur during the transition time associated with switching past accessory device control to the belt worn handset of the past. The system and method advantageously avoids missed receive calls associated with past approaches which switched control to the handset device, where transition times could take up to 500 ms. The embodiments provide advantages over existing noise cancelling RSMs which are limited to a fault path for transmit audio and a single support path for receive audio. Unlike some receive only systems such as television applications that are limited to switching an audio output between multiple sources, the communication system provided by the various embodiments maintains audio integrity of a single source between multiple paths based on the status of the system. Functionality of the system 100 and method 200 can be readily tested by simply removing the battery from the primary controlling device thereby making the approach highly detectable in the field.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for operating a portable communication system, comprising:
    tethering an accessory to a portable handset;
    operating the accessory as a primary device and the handset as a secondary device, wherein mission critical user interface features of the primary device comprising PTT, emergency, and transmit/receive (TX/RX) audio are controlled by a mission critical processor of the primary device, while the PTT and emergency are controlled by both the mission critical processor and a main application processor of the primary device;
    monitoring, by a watchdog timer of the primary device, for a status change indicating one or more fault conditions comprising:
        a fault at the mission critical processor of the primary device; and
        a battery depletion fault of the primary device;
    triggering, in response to the status change, a handover of control from the mission critical processor of the primary device to the secondary device, thereby maintaining the mission critical user interface features at the primary device while under the control of the secondary device.

2. The method of claim 1, wherein in response to the status change indicating battery depletion at the primary device, the method further comprises:
    re-routing transmit and receive audio, through a backup path, that provides an alternative route for audio signals between the primary device and the secondary device that is analog-only without reliance on any processors of the primary device.

3. The method of claim 1, wherein in response to the status change indicating a fault at the application processor of the primary device, the method further comprises:
    isolating mission critical functionality comprising audio processing, routing, and control from the application processor on the primary device to the mission critical processor of the primary device, wherein the mission critical processor of the primary device is only assigned to the audio processing, routing, and control, thereby providing immunity to application processor failures at primary device.

4. The method of claim 1, wherein the handover taking place to the secondary device is transparent to the user.

5. The method of claim 4, wherein the transparent handover to the secondary device takes place without audio holes, latencies, missed PTT, or missed emergency.

6. The method of claim 1, wherein the portable communication system comprises a portable public safety communication system.

7. The method of claim 1, wherein primary device comprises an LTE accessory, and the secondary device comprises a land mobile radio (LMR) handset.

8. The method of claim 7, wherein receive audio is routed over a low power path of the LTE accessory during normal mode operation, and receive audio is routed over a high power back up audio path during the fault at the mission critical processor of the primary device.

* * * * *